United States Patent
Sorger et al.

(10) Patent No.: US 9,670,094 B2
(45) Date of Patent: Jun. 6, 2017

(54) PERVIOUS CONCRETE COMPOSITION

(75) Inventors: Klas Sorger, München (DE); Jürgen Bezler, Burghausen (DE)

(73) Assignee: Wacker Chemie AG, Munich (DE)

( * ) Notice: Subject to any disclaimer, the term of this patent is extended or adjusted under 35 U.S.C. 154(b) by 1023 days.

(21) Appl. No.: 13/132,798

(22) PCT Filed: Dec. 3, 2009

(86) PCT No.: PCT/EP2009/066283
§ 371 (c)(1),
(2), (4) Date: Jun. 3, 2011

(87) PCT Pub. No.: WO2010/063782
PCT Pub. Date: Jun. 10, 2010

(65) Prior Publication Data
US 2011/0230598 A1    Sep. 22, 2011

(30) Foreign Application Priority Data
Dec. 5, 2008    (DE) .................. 10 2008 044 395

(51) Int. Cl.
| | |
|---|---|
| C04B 24/26 | (2006.01) |
| C04B 28/02 | (2006.01) |
| E01C 11/22 | (2006.01) |
| C04B 103/00 | (2006.01) |
| C04B 111/00 | (2006.01) |
| C04B 111/52 | (2006.01) |
| C04B 111/74 | (2006.01) |

(52) U.S. Cl.
CPC ............ *C04B 28/02* (2013.01); *E01C 11/226* (2013.01); *C04B 2103/0065* (2013.01); *C04B 2111/0075* (2013.01); *C04B 2111/00793* (2013.01); *C04B 2111/52* (2013.01); *C04B 2111/74* (2013.01)

(58) Field of Classification Search
CPC . C04B 28/02; C04B 38/0058; C04B 38/0074; C04B 2103/0065; C04B 2111/0075; C04B 2103/304; E01C 11/226; C08F 210/02; C08F 218/08
USPC ............ 524/5, 502–503, 561–563, 803, 822; 106/692; 526/330–331, 329.5
See application file for complete search history.

(56) References Cited

U.S. PATENT DOCUMENTS

| | | | | |
|---|---|---|---|---|
| 5,747,578 A | * | 5/1998 | Schmitz et al. | 524/502 |
| 5,861,057 A | * | 1/1999 | Berg et al. | 106/672 |
| 6,166,113 A | | 12/2000 | Haerzschel et al. | |
| 6,566,434 B1 | | 5/2003 | Mayer | |
| 6,653,372 B1 | | 11/2003 | Pakusch | |
| 2004/0097645 A1 | * | 5/2004 | Weitzel et al. | 524/803 |
| 2004/0229978 A1 | | 11/2004 | Bowe | |
| 2007/0155862 A1 | * | 7/2007 | Haerzschel et al. | 524/5 |
| 2007/0223998 A1 | | 9/2007 | Hartenburg | |
| 2010/0112329 A1 | | 5/2010 | Yi | |
| 2011/0230598 A1 | | 9/2011 | Sorger et al. | |

FOREIGN PATENT DOCUMENTS

| | | |
|---|---|---|
| CA | 941392 | 2/1974 |
| CN | 1749482 A | 3/2006 |
| DE | 1953158 | 5/1971 |
| DE | 19853450 | 5/2000 |
| DE | 10062656 | 6/2002 |
| DE | 102004006165 | 8/2005 |
| DE | 102004013468 | 10/2005 |
| DE | 202005014693 | 1/2006 |
| EP | 0710633 A1 | 5/1996 |
| EP | 0710633 B1 | 4/1999 |
| EP | 2 352 707 B1 | 8/2011 |
| JP | 1-126251 A2 | 5/1989 |
| JP | 2000-500731 T | 1/2000 |
| JP | 2001-233662 A2 | 8/2001 |
| JP | 2008-008125 A2 | 1/2008 |
| WO | 2008052482 | 5/2008 |

OTHER PUBLICATIONS

Fox, T. G., Bull. Am. Physics Soc., 1, 3, p. 123 (1956).
Polymer Handbook 2nd Edition, J. Wiley & Sons, New York (1975).
International Search Report for PCT/EP2009/066283 filed Dec. 3, 2009, mailed Apr. 6, 2010.
Vinnapas Dispersionspulver Dispersionen (Brochure) (Wacker Polymer Systems) Nov. 2000.
English language patent abstract corresponding to JP 1-126251 A2.
English language patent abstract corresponding to 2001-233662 A2.
English language patent abstract corresponding to 2008-008125 A2.
Yoshihiko Ohama & Katsunori Demura, Polymer Concrete, Kabushiki Kaisha CMC; Feb. 27, 1984, p. 15.
Minoru Tokumoto, Polymer-Mixed Cement, 1st edition, Kabushiki Kaisha Kobunshi Kanko-kai; Feb. 1, 1995, pp. 38-43.
English language bibliographic abstract of Yoshihiko Ohama & Katsunori Demure, Polymer Concrete, Kabushiki Kaisha CMC; Feb. 27, 1984, p. 15.
English language bibliographic abstract of Minoru Tokumoto, Polymer-Mixed Cement, 1st edition, Kabushiki Kaisha Kobunshi Kanko-kai; Feb. 1, 1995, pp. 38-43.
English language abstract corresponding to CN 1749482.
"Study on the preparation and properties of pervious concrete pavement materials" by Huo Liang, published Dec. 31, 2005, chapters 1-2.

(Continued)

*Primary Examiner* — Michael A Salvitti
(74) *Attorney, Agent, or Firm* — RatnerPrestia

(57) ABSTRACT

The invention relates to pervious concrete compositions containing hydraulic binder, filler and polymer, characterized in that the polymer present is a vinyl acetate-ethylene-copolymer having a glass transition temperature Tg of $\leq 20°$ C.

12 Claims, No Drawings

(56) References Cited

OTHER PUBLICATIONS

English language abstract of "Study on the preparation and properties of pervious concrete pavement materials" by Huo Liang.
"Polymer composite material for concrete and its applications" by Mai Shufang, published Dec. 31, 1996, pp. 141-142.
English translation of pp. 141-142 of "Polymer composite material for concrete and its applications" by Mai Shufang.

* cited by examiner

PERVIOUS CONCRETE COMPOSITION

CROSS REFERENCE TO RELATED APPLICATIONS

This application is the national phase filing of international patent application No. PCT/EP2009/066283, filed 3 Dec. 2009, and claims priority of German patent application number 10 2008 044 395.6, filed 5 Dec. 2008, the entireties of which applications are incorporated herein by reference.

FIELD OF THE INVENTION

The invention relates to a pervious concrete composition containing cement, filler and polymer, a process for the production of the pervious concrete composition, and the use of the pervious concrete composition.

BACKGROUND OF THE INVENTION

Pervious concrete is a no-fines, cavity-rich concrete. The cavity volume of pervious concrete is between 10 and 35 vol. %, preferably 20 to 25 vol. %. The no-fines pores arise through the use of fillers of narrowly limited particle size group, wherein usually only a single particle size group is used (uniform grain size, such as for example 5/8 mm chippings) and with almost complete reduction of the content of fine components. Pervious concrete has just sufficient cement binder that the individual grains of the aggregate are only cemented together at the contact sites by a thin hardened cement layer and after compaction the cavities between the individual grains are still not filled. Open-pore concrete (pervious concrete) is in particular used for noise reduction in infrastructure projects, for example in road construction, in order to construct low-noise pavements. In addition, because of its open-pore nature, pervious concrete is also used for drainage in seepage-prone traffic areas, for example parking lots, exhibition areas and cycle routes. The longevity of these pavement systems is limited owing to the formation of cracks and particle escape. In order to remedy these defects, pervious concrete is modified with polymer dispersions.

In pervious concrete layers, the use of polymers leads to an improvement in the freeze-thaw resistance, crack resistance and less particle escape, and thus increases the stability of the pervious concrete layer and its lifetime. What is decisive here is that the flexibility of the concrete matrix is sufficiently increased and thus crack formation and grain escape are minimized, but at the same time the mechanical strength is also maintained, in order sufficiently to ensure the durability of the concrete.

In DE-OS 1953158, a water-permeable porous concrete is described which is produced from granular mineral aggregates of a uniform grain fraction, a binder such as cement and a water-soluble macromolecular substance and if necessary an aqueous dispersion of a thermo-plastic resin such as polyvinyl acetate. However, this system does not meet the requirements for the durability of water-permeable and noise-absorbing road surfaces, since the water-soluble macromolecular substances can be washed out by rainwater and pure polyvinyl acetate becomes brittle at low temperatures of <10° C.

In DE 102004006165 A1, a multilayer open-pore floor covering is described, the top open-pore layer whereof is incorporated with one or two component polyurethane or epoxide adhesives as binders. The costly incorporation of the whole system in several layers, and the use of polyurethane or epoxide adhesives as binders, without cheaper mineral binders such as cement, make the floor covering expensive and not widely utilizable. Moreover, polyurethane and epoxide adhesives are not ecologically problem-free.

The subject of EP 0710633 B1 is a pervious concrete which contains a polymeric binder in the form of an anionic styrene/(meth)acrylate copolymer. The styrene-acrylate copolymers used should preferably have a high minimum film-forming temperature (MFT) in the range from 35° C. to 50° C. Such styrene copolymers are rigid polymers, which do not sufficiently increase the flexibility of the open-pore concrete layer and have inadequate crack bridging properties. Since rigid styrene acrylates of high MFT become brittle at low temperatures <10° C. and their performance is impaired, crack formation and grain escape occur in the uniform grain size concrete layer, resulting in poor durability, in particular after the winter period.

In WO 2008/052482 A1, a road surface of open-pore, polymer-modified concrete and a process for the production of such surfaces are claimed. The structure consists of a base course, bonding course, pervious concrete and surface treatment layer. For the polymer modification of the pervious concrete layer or the bonding course, any polymer dispersions are used. The structure has the disadvantage that a surface treatment layer is necessary to improve the wear of the pervious concrete layer and the skid resistance. This surface treatment layer is applied in the form of a polymer-modified mortar which can partly seal off the pores of the pervious concrete layer which has an adverse effect on the noise-absorbing properties and the drainage of the open-pore structure. Moreover, its application requires an additional working step, which adversely affects the economics.

SUMMARY OF THE INVENTION

The problem therefore existed of improving the pervious concrete composition sufficiently that crack formation and grain escape are minimized, without the mechanical strength suffering thereby. In addition, it should be possible to dispense with the application of a surface treatment layer. Surprisingly, it was found that the vinyl acetate ethylene copolymers according to the invention increase the bending tensile strength and hence the flexibility of the pervious concrete under various climatic conditions (both at cold and also at hot temperatures) compared to the state of the art.

A subject of the invention are pervious concrete compositions containing hydraulic binders, filler and polymer, characterized in that a vinyl acetate ethylene copolymer with a glass transition temperature Tg of $\leq 20°$ C. is contained as the polymer.

DETAILED DESCRIPTION OF THE INVENTION

Suitable hydraulic binders are one or more from the group comprising cement, in particular Portland cement, aluminate cement, trass cement, slag cement, magnesia cement, phosphate cement or blast furnace cement; and mixed cements (composite cements). Portland cement and mixed cements of different cement types or mixed cements with substances which result in the improvement of the cement, such as pozzolans, for example fly ash or silica dust are preferred. The preferred mixed cement is Portland-slag cement. The hydraulic binder is generally used in an quantity from 10 to 50 wt. %, preferably 10 to 30 wt. %, each based on the total weight of the dry mass of the pervious concrete composition.

Suitable fillers are coarse gravel or chippings, preferably with as uniform a particle size distribution as possible. The particle size is generally 3 to 25 mm, preferably 5 to 11 mm. Examples of suitable fillers are high-grade chippings 5/8, chippings 5/8, chippings 8/11 and rounded-grain gravel, particularly preferably chippings 5/8 and high-grade chippings 5/8. The filler is generally used in a quantity from 50 to 58 wt. %, preferably 60 to 80 wt. %, each based on the total weight of the dry mass of the pervious concrete composition.

A suitable further filler is sand. The particle size is generally 0 to 4 mm, preferably 0 to 2 mm. Examples of sand are quartz sand, quartz sand meal, crushed sand 0/2 and fine crushed sand 0/0.25. The sand is used in small quantities from 0.05 to 20 wt. %, preferably 1 to 10 wt. %, each based on the total weight of the dry mass of the pervious concrete composition. Through the use of polish-resistant sand, the static coefficient of friction and hence the grip of vehicle tires on the road surface can be increased.

The application technology properties of the pervious concrete compositions can be improved by addition of additives. Examples of these are fibers, thickeners, pigments, foam stabilizers, antifoam agents, setting accelerators, hydrophobizing agents, plasticizers, flow agents, air pore agents for controlling the concrete density or pumping aids for improving pumpability. The quantities of these additives used are well known to those skilled in the art.

Suitable polymers are vinyl acetate-ethylene copolymers with a glass transition temperature Tg of ≤20° C. The ethylene content is preferably 1 to 25 wt. %. Protective colloid-stabilized vinyl acetate-ethylene copolymers of the stated specification are preferred. The glass transition temperature Tg is preferably −15° C. to +20° C., preferably −10° C. to +15° C., particularly preferably −10° C. to +8° C., and most preferably −10° C. to 0° C. The glass transition temperature Tg of the polymers can be determined in known manner by differential scanning calorimetry (DSC). The Tg can also be approximately predicted by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, wherein $x_n$ stands for the mass fraction (wt. %/100) of the monomer n, and $Tg_n$ is the glass transition temperature in Kelvin of the homopolymer of the monomer n. Tg values for homopolymers are listed in the Polymer Handbook $2^{nd}$ Edition, J. Wiley & Sons, New York (1975).

The vinyl acetate-ethylene copolymers can contain further comonomers. Suitable further comonomers are those from the group of the vinyl esters of carboxylic acids with 3 to 12 C atoms, esters of acrylic acid or methacrylic acid, vinyl halides such as vinyl chloride and olefins such as propylene. Suitable vinyl esters are vinyl propionate, vinyl butyrate, vinyl 2-ethyl-hexanoate, vinyl laurate, 1-methyl-vinyl acetate, vinyl pivalate and vinyl esters of α-branched monocarboxylic acids with 9 to 11 C atoms, for example VeoVa9® or VeoVa10® (trade marks of the company Resolution). Suitable methacrylic acid esters or acrylic acid esters are esters of unbranched or branched alcohols with 1 to C atoms such as methyl acrylate, methyl methacrylate, ethyl acrylate, ethyl methacrylate, propyl acrylate, propyl methacrylate, n-butyl acrylate, n-butyl methacrylate, 2-ethylhexyl acrylate and norbornyl acrylate. These comonomers are as necessary copolymerized in a quantity of 1 to 30 wt. %, based on the total weight of the copolymer.

If necessary, 0.05 to 10 wt. % of auxiliary monomers, based on the total weight of the copolymer, can also be copolymerized. Examples of auxiliary monomers are ethylenically unsaturated mono and dicarboxylic acids, preferably acrylic acid, methacrylic acid, fumaric acid and maleic acid, ethylenically unsaturated carboxylic acid amides and nitriles, preferably acrylamide and acrylonitrile, mono and diesters of fumaric acid and maleic acid such as the diethyl and diisopropyl esters, and maleic anhydride, ethylenically unsaturated sulfonic acids or salts thereof, preferably vinylsulfonic acid or 2-acrylamido-2-methylpropanesulfonic acid. Further examples are precrosslinking comonomers such as multiply ethylenically unsaturated comonomers, for example divinyl adipate, diallyl maleate, allyl methacrylate or triallyl cyanurate, or postcrosslinking comonomers, for example acrylamidoglycolic acid (AGA), methyacrylamidoglycolic acid methyl ester (MAGME), N-methylolacrylamide (NMA), N-methylolmethacrylamide (NMMA), N-methylol allyl carbamate, alkyl ethers such as the isobutoxy ether or ester of N-methylolacrylamide of N-methylolmethacrylamide and of N-methylol allyl carbamate. Also suitable are epoxide functional comonomers such as glycidyl methacrylate and glycidyl acrylate. Further examples are silicon functional comonomers such as acryloxypropyl tri(alkoxy)- and methacryloxypropyl tri(alkoxy)-silanes, vinyltrialkoxy silanes and vinylmethyldialkoxysilanes, wherein for example methoxy, ethoxy, and ethoxypropylene glycol ether residues can be contained as alkoxy groups. Monomers with hydroxy or CO groups, for example methacrylic acid and acrylic acid hydroxyalkyl esters such as hydroxyethyl, hydroxypropyl or hydroxybutyl acrylate or methacrylate and compounds such as diacetone-acrylamide and acetyloxyethyl acrylate or methacrylate may also be mentioned.

Particularly preferred are copolymers with 75 to 90 wt. % of vinyl acetate and 10 to 25 wt. % of ethylene, and copolymers of 30 to 90 wt. % of vinyl acetate with 1 to 25 wt. % of ethylene and 1 to 50 wt. % of one or more further copolymers from the group of vinyl esters with 3 to 12 C atoms in the carboxylic acid residue such as vinyl propionate, vinyl laurate, vinyl esters of alpha-branched carboxylic acids with 9 to 11 C atoms such as VeoVa9, VeoVa10 and VeoVa11, and copolymers of 30 to 90 wt. % of vinyl acetate, 1 to 25 wt. % of ethylene and preferably 1 to 60 wt. % of (meth)acrylic acid esters of unbranched or branched alcohols with 1 to 15 C atoms, in particular methyl methacrylate, n-butyl acrylate or 2-ethylhexyl acrylate; and copolymers of 30 to 90 wt. % of vinyl acetate, 1 to 30 wt. % of vinyl laurate or vinyl esters of an alpha-branched carboxylic acid with 9 to 11 C atoms and 1 to 30 wt. % of (meth)acrylic acid esters of unbranched or branched alcohols with 1 to 15 C atoms, in particular methyl methacrylate, n-butyl acrylate or 2-ethylhexyl acrylate, which also contain 1 to 25 wt. % of ethylene; wherein the copolymers can further contain said auxiliary monomers in said quantities and the data in wt. % in each case add up to 100 wt. %.

The copolymers are produced by the emulsion polymerization process, wherein the polymerization temperature is generally 40° C. to 100° C., preferably 60° C. to 90° C. The polymerization is initiated with the redox initiation combinations usual for emulsion polymerization. To control the molecular weight, regulating substances can be used during the polymerization. The polymerization is preferably effected in the presence of protective colloids.

Suitable protective colloids are partly saponified or completely saponified polyvinyl alcohols, polyvinyl acetals, polyvinylpyrrolidones, polysaccharides in water-soluble form such as starches (amylose and amylopectin), celluloses and carboxymethyl, methyl, hydroxyethyl and hydroxypropyl derivatives thereof, proteins such as casein or caseinate, soya protein, gelatin, ligninsulfonates, synthetic polymers such as poly(meth)acrylic acid, copolymers of (meth)acrylates with carboxyl functional comonomer units, poly(meth)acrylamide, polyvinylsulfonic acids and water-soluble copolymers thereof, melamine-formaldehyde sulfonates, naphthalene-formaldehyde sulfonates, styrene maleic acid and vinyl ether maleic acid copolymers, and cationic protective colloids, for example polymers with monomer units with quaternary ammonium groups. Partly saponified polyvinyl alcohols with a hydrolysis level of 80 to 95 mol. % and a Höppler viscosity in 4% aqueous solution of 1 to 30 mPas (Method after Höppler at 20° C., DIN 53015) are preferred. In the polymerization, the protective colloids are generally added in a quantity of 1 to 20 wt. % overall, based on the total weight of the monomers.

The polymerization is preferably performed without addition of emulsifiers. In exceptional cases, it can be advantageous also additionally to add small quantities of emulsifiers, if necessary 1 to 5 wt. % based on the amount of monomer. The aqueous dispersions thereby obtained have a solids content from 30 to 75 wt. % preferably from 50 to 60 wt. %.

For the production of the polymer powders redispersible in water, the aqueous dispersions, if necessary after addition of protective colloids as a drying aid, are dried, for example by fluidized bed drying, freeze-drying or spray-drying. The dispersions are preferably spray-dried. As a rule, the drying aid is used in a total quantity of 3 to 30 wt. %, based on the polymeric components of the dispersion. This means that the total quantity of protective colloid before the drying procedure should be 3 to 30 wt. %, based on the polymer component, preferably 5 to 20 wt. % based on the polymer component are used. Suitable and preferred drying aids are the protective colloids mentioned as suitable and preferred.

The vinyl acetate-ethylene copolymer, preferably protective colloid-stabilized vinyl acetate-ethylene copolymer, is used in a quantity from 1 to 20 wt. %, preferably 5 to 15 wt. %, in the pervious concrete composition, where the data in wt. % are based on the content of hydraulic binder in the pervious concrete composition, and the data in wt. % in each case add up to 100 wt. %. The vinyl acetate-ethylene copolymers can be used in the form of aqueous dispersions thereof or in the form of polymer powders thereof redispersible in water. With the use of the copolymers in the form of aqueous dispersions, the content thereof is calculated on the basis of the dry weight of the copolymer.

For the production of the pervious concrete composition the components of the composition are mixed together with water. The quantity of water based on hydraulic binder is calculated here such that the water-cement factor of the composition is about 0.1 to 0.6, preferably 0.2 to 0.4.

The pervious concrete composition can be processed with the usual machines. In road construction for example with the road pavers usual in asphalt laying. To improve the bonding of the pervious concrete layer with the base course, a bonding course can be applied before the application of the pervious concrete layer. The formula for such bonding courses is well known to those skilled in the art.

Apart from the use of the pervious concrete composition in road construction, for example for the production of carriageway surfaces or drainable surfaces, these can also be used in hydraulic engineering. Further uses are those for the production of concrete filter moldings such as concrete filter pipes, filter blocks and filter plates, and for the production of noise protection walls.

Essentially, strict requirements are set for the polymers in the pervious concrete, since because of the open-pore nature of the system internal regions are also markedly exposed to weathering (perfusion of large surface regions of the whole concrete matrix). By use of said vinyl acetate-ethylene copolymers according to the invention, the flexibility of the uniform grain size concrete layer is increased. Surprisingly, in contrast to the previously used styrene-acrylate copolymers, at low external temperatures (autumn, winter, spring day) of about <5° C. the flexibility of the noise-absorbing monograin layer is retained (see Storage 1 and 4). Under these conditions, the vinyl acetate-ethylene copolymers exhibit bending tensile strengths which are comparable with those at higher temperatures (warm summer day, direct insolation). On the other hand, styrene-acrylate copolymers and vinyl acetate-ethylene copolymers with higher Tg become brittle at temperatures <5° C. and the lower flexibility (bending tensile strength) of the uniform grain size concrete layer due to this leads to intensified cracking and grain escape, particularly on cold days, which manifests itself in unsatisfactory durability, particularly after the winter period.

The following examples serve for further explanation of the invention:

For the production of the pervious concrete, the following formula was used:
17.4 parts by weight of Portland cement (CEM I 42.5 N)
82.4 parts by weight of high-grade chippings 5/8 mm
0.05 parts by weight of antifoam agent (Agitan P 801)
0.21 parts by weight of concrete plasticizer (Melment F 10)
w/c=0.28

6 kg of this dry mixture were premixed for a few seconds in a forced action mixer. Next, 0.188 kg of water were added and 0.209 kg of polymer dispersion (the water content of the dispersion was calculated for the w/c). All the components were mixed for 3 minutes. There followed a resting time of 3 minutes, before mixing once more for 1 minute.

The following polymer dispersions, each with a solids content of 50%, were tested:

EXAMPLE 1

Polyvinyl alcohol-stabilized aqueous dispersion of a vinyl acetate-ethylene copolymer (ethylene content: 14 wt. %) with a glass transition temperature of +5° C.

EXAMPLE 2

Polyvinyl alcohol-stabilized aqueous dispersion of a vinyl acetate-ethylene copolymer (ethylene content: 21 wt. %) with a glass transition temperature of −7° C.

EXAMPLE 3

Polyvinyl alcohol-stabilized aqueous dispersion of a vinyl acetate-ethylene-Veova10-methyl methacrylate copolymer (ethylene content: 8 wt. %) with a glass transition temperature of +13° C.

EXAMPLE 4

Polyvinyl alcohol-stabilized aqueous dispersion of a vinyl acetate-ethylene-Veova10-methyl methacrylate copolymer (ethylene content: 12 wt. %) with a glass transition temperature of +6° C.

COMPARATIVE EXAMPLE 1

Anionically stabilized aqueous dispersion of a styrene-butyl acrylate copolymer with a glass transition temperature of +21° C.

Preparation of the Test Specimens 3 test specimens per storage were prepared (dimensions: 40 mm high, 40 mm wide, 160 mm long). For this the concrete mixture was introduced into steel formwork and compacted to the desired cavity content of about 24% by application of a load. The formwork was stored covered with film in the climatic chamber (23° C./50% relative humidity) for 24 hrs until removal of the formwork.

For determination of the theoretical cavity content, the mass of the prisms was determined directly before measurement of the bending tensile strength. For the cavity contents of the specimens produced at the age of 28 days with storage in the climatic chamber (23° C./50% relative humidity), the following values were found:

Example 1: 23.8%
Example 2: 24.0%
Example 3: 24.1%
Example 4: 23.7%
Comparative Example 1: 24.0%

The bending tensile strength was determined in a three point bending tensile test (loading with a single load in the middle of the specimen) on the basis of DIN 1048-5 or according to DIN 12808-3 after storage under the following conditions:

Storage L1
  Storage normal climate: 28 days NC (23° C./50% rel. hum.)
  Bending tensile strength measurement at 23° C.
Storage L2
  Hot storage: 14 days NC, 14 days 70° C.
  Bending tensile strength measurement at 23° C.
Storage L3
  Freeze-thaw storage, water and 25 freeze-thaw cycles 7 days NC, 21 days water (20° C.), −20° C. for 4 hrs, +20° C. in water for 2 hrs, 3 days NC.
  Bending tensile strength measurement at 23° C.
Storage L4
  Storage normal climate: 28 days NC (23° C./50% rel. hum.), 2 days 0° C.
  Bending tensile strength measurement at 0° C.

The results are summarized in Table 1:

TABLE 1

| Examples | L1 BTS [N/mm$^2$] | L2 BTS [N/mm$^2$] | L3 BTS [N/mm$^2$] | L4 BTS [N/mm$^2$] |
|---|---|---|---|---|
| Ex. 1 | 6.39 | 6.10 | 5.30 | 6.62 |
| Ex. 2 | 5.59 | 5.41 | 5.81 | 6.21 |
| Ex. 3 | 6.58 | 4.99 | 4.98 | 7.01 |
| Ex. 4 | 6.10 | 5.38 | 5.68 | 6.63 |
| C. Ex. 1 | 5.50 | 4.99 | 5.71 | 5.46 |

The invention claimed is:

1. A pervious concrete composition with a cavity volume between 10 and 35 vol. %, containing hydraulic binder, filler and polymer, wherein a vinyl acetate-ethylene copolymer with a glass transition temperature $T_g$ of ≤20° C. is contained as the polymer.

2. The pervious concrete composition as claimed in claim 1, wherein a protective colloid-stabilized vinyl acetate-ethylene copolymer is contained.

3. The pervious concrete composition as claimed in claim 1, wherein the glass transition temperature $T_g$ is −10° C. to +15° C.

4. The pervious concrete composition as claimed in claim 1, wherein the glass transition temperature $T_g$ is −10° C. to +8° C.

5. The pervious concrete composition as claimed in claim 1, wherein the glass transition temperature $T_g$ is −10° C. to 0° C.

6. The pervious concrete composition as claimed in claim 2, wherein as the protective colloid partly saponified polyvinyl alcohols with a hydrolysis level from 80 to 95 mol. % and a Höppler viscosity, in 4% aqueous solution, of 1 to 30 mPas are contained.

7. The pervious concrete composition as claimed in claim 1, wherein copolymers with 75 to 90 wt. % of vinyl acetate and 10 to 25 wt. % of ethylene are contained.

8. The pervious concrete composition as claimed in claim 1, wherein copolymers of 30 to 90 wt. % of vinyl acetate with 1 to 25 wt. % of ethylene and 1 to 50 wt. % of one or more further comonomers selected from the group consisting of the vinyl esters with 3 to 12 C atoms in the carboxylic acid residue are contained.

9. The pervious concrete composition as claimed in claim 1, wherein copolymers of 30 to 90 wt. % of vinyl acetate, 1 to 25 wt. % of ethylene and 1 to 60 wt. % of (meth)acrylic acid esters of unbranched or branched alcohols with 1 to 15 C atoms are contained.

10. The pervious concrete composition as claimed in claim 1, wherein copolymers of 30 to 90 wt. % of vinyl acetate, 1 to 30 wt. % of vinyl laurate or vinyl esters of an alpha-branched carboxylic acid with 9 to 11 C atoms, and 1 to 30 wt. % of (meth)acrylic acid esters of unbranched or branched alcohols with 1 to 15 C atoms, which also contain 1 to 25 wt. % of ethylene, are contained.

11. A road construction or hydraulic engineering composition comprising the pervious concrete composition as claimed in claim 1.

12. A concrete filter molding or noise protection wall comprising the pervious concrete composition as claimed in claim 1.

* * * * *